United States Patent
Kawahara et al.

(10) Patent No.: US 9,641,887 B2
(45) Date of Patent: May 2, 2017

(54) STORAGE SYSTEM

(75) Inventors: Hiroyuki Kawahara, Tokyo (JP);
Tatsuto Suetomi, Chiba (JP);
Masayoshi Mizuno, Tokyo (JP);
Naoyuki Miyada, Tokyo (JP); Kensaku Ishizuka, Tokyo (JP); Kiyoto Shibuya, Saitama (JP)

(73) Assignees: SONY CORPORATION, Tokyo (JP);
SONY INTERACTIVE ENTERTAINMENT INC., Tokyo (JP)

( * ) Notice: Subject to any disclaimer, the term of this patent is extended or adjusted under 35 U.S.C. 154(b) by 220 days.

(21) Appl. No.: 13/609,494

(22) Filed: Sep. 11, 2012

(65) Prior Publication Data
US 2013/0108247 A1 May 2, 2013

(30) Foreign Application Priority Data

Oct. 28, 2011 (JP) ................................ 2011-237832

(51) Int. Cl.
*H04N 5/91* (2006.01)
*H04N 21/4147* (2011.01)
(Continued)

(52) U.S. Cl.
CPC ..... *H04N 21/4147* (2013.01); *G06F 17/3007* (2013.01); *H04L 12/2809* (2013.01);
(Continued)

(58) Field of Classification Search
CPC ... H04H 20/40; H04L 12/189; H04L 67/1074; H04N 21/4126; H04N 21/4122; H04N 21/6125

See application file for complete search history.

(56) References Cited

U.S. PATENT DOCUMENTS

2002/0196771 A1* 12/2002 Vij et al. ................... 370/349
2003/0079016 A1*  4/2003 Tsao ........................ 709/226
(Continued)

FOREIGN PATENT DOCUMENTS

JP   2002-185900   6/2002
JP   2003-224738   8/2003
(Continued)

OTHER PUBLICATIONS

Notification of Reason(s) for Refusal dated Sep. 10, 2013, from corresponding Japanese Application No. 2011-237832.
(Continued)

*Primary Examiner* — Hung Dang
*Assistant Examiner* — Sunghyoun Park
(74) *Attorney, Agent, or Firm* — Katten Muchin Rosenman LLP

(57) ABSTRACT

In a storage system, client devices and storage devices are connected to a network. An application for controlling the recording function of the storage device is installed on the client device. The client device, which accesses the storage device, is provided with a user interface with which a user operates the storage device. The storage device has a network attached storage (NAS) function and a recording function, and the storage device has no interface of its own with which to operate. A plurality of the storage devices are connectable to the network. When the client device registers the plurality of storage devices connected to the network, the client device accesses the plurality of storage devices registered and provides the user with a single user interface.

5 Claims, 3 Drawing Sheets

(51) Int. Cl.
  H04N 5/775    (2006.01)
  H04N 21/432   (2011.01)
  H04N 21/442   (2011.01)
  H04N 21/475   (2011.01)
  H04N 21/482   (2011.01)
  H04N 21/488   (2011.01)
  H04L 29/08    (2006.01)
  H04L 12/28    (2006.01)
  G06F 17/30    (2006.01)
  G06F 3/06     (2006.01)

(52) U.S. Cl.
  CPC ......... *H04L 67/1097* (2013.01); *H04N 5/775* (2013.01); *H04N 21/4325* (2013.01); *H04N 21/44227* (2013.01); *H04N 21/4753* (2013.01); *H04N 21/482* (2013.01); *H04N 21/4882* (2013.01); *G06F 3/0607* (2013.01); *G06F 3/067* (2013.01); *G06F 3/0622* (2013.01); *G06F 3/0632* (2013.01); *H04L 2012/2849* (2013.01)

(56) References Cited

U.S. PATENT DOCUMENTS

| | | | |
|---|---|---|---|
| 2005/0240803 A1* | 10/2005 | Saika et al. | 714/5 |
| 2006/0024025 A1* | 2/2006 | Miyazawa et al. | 386/69 |
| 2009/0074387 A1* | 3/2009 | Adachi | 386/124 |
| 2009/0182835 A1* | 7/2009 | Aviles et al. | 709/213 |
| 2011/0145324 A1* | 6/2011 | Reinart et al. | 709/203 |

FOREIGN PATENT DOCUMENTS

| | | |
|---|---|---|
| JP | 2005-333534 | 12/2005 |
| JP | 2006-155860 | 6/2006 |
| JP | 2006-303873 | 11/2006 |
| JP | 2008-040858 | 2/2008 |
| JP | 2008-251082 | 10/2008 |
| JP | 2009-146384 | 7/2009 |
| JP | 2011-175717 | 9/2011 |
| WO | 2005/117438 | 12/2005 |
| WO | 2011/070706 | 6/2011 |

OTHER PUBLICATIONS

Notification of Reasons for Refusal dated Apr. 8, 2014 for corresponding Japanese Application No. 2011-237832.

Japanese Notification of Reason for Refusal dated May 19, 2015 from corresponding Application No. 2014-146524.

* cited by examiner

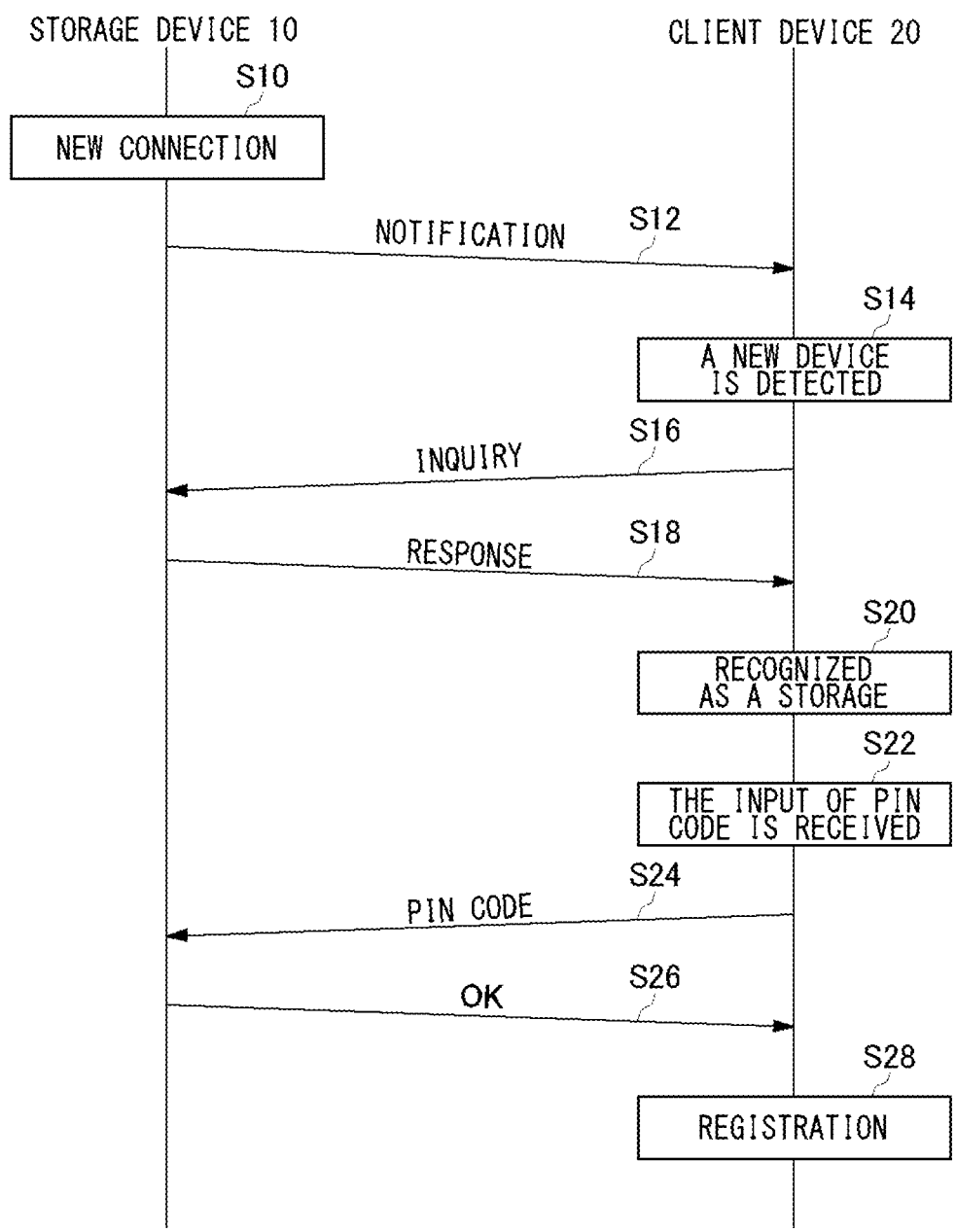

FIG.3A

```
A STORAGE IS DETECTED.
ENTER ITS PIN CODE.

(1) DEVICE ID: ABCDEF0123
    [                    ]
```

FIG.3B

```
TWO STORAGES ARE DETECTED.
ENTER THEIR PIN CODES.

(1) DEVICE ID: ABCDEF0123
    [                    ]

(2) DEVICE ID: 987654CBA0
    [                    ]
```

STORAGE SYSTEM

BACKGROUND OF THE INVENTION

1. Field of the Invention

The present invention relates to a storage system.

2. Description of the Related Art

In recent years, it becomes common to construct a storage system at home where a network attached storage (NAS) is connected to a computer network. The NAS is a file server equipped with a hard disk drive and provides a content file to a client device via a TCP/IP network.

Personal video recorders (PVRs) for recording images broadcast by television programs and the like on hard disk drives are in widespread use. The PVR in recent years is compatible with both the digital terrestrial broadcasting and the digital satellite broadcasting, so that a user can record his/her favorite television programs by operating on a user interface.

The PVR provides a unique user interface for user operations. Thus, when the user replaces the PVR with new one, the user interface provided by the new PVR may differ greatly from that of the old PVR. This causes a problem where it takes some time for the user to familiarize himself/herself with the new user interface. Also, when the user replaces the PVR with new one having a larger recording capacity, the old PVR will not be used at all even though it works perfectly. Eventually, the old PVR may be disposed of or brought to a thrift shop. Since the PVRs are far from cheap, replacing and repurchasing the PVRs one after another is not desirable in the light of resources and household budgets.

SUMMARY OF THE INVENTION

A purpose of the present invention is therefore to provide a new type of storage system.

In order to resolve the aforementioned problems, one embodiment of the present invention provides a storage system where a client device and a storage device are connected to a network. The client device, which accesses the storage device, provides a user with a user interface with which the user operates the storage device. The storage device has a network attached storage (NAS) function and a recording function, and the storage device has no user interface with which the user operates the storage device, namely, the storage device has no video output.

Optional combinations of the aforementioned constituting elements, and implementations of the invention in the form of methods, apparatuses, systems, recording media, computer programs, and so forth may also be practiced as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which:

FIG. 2 is a flowchart showing a registration processing performed by a storage device; and FIGS. 3A and 3B illustrate entry screens of pin code(s).

DETAILED DESCRIPTION OF THE INVENTION

Figure 1:
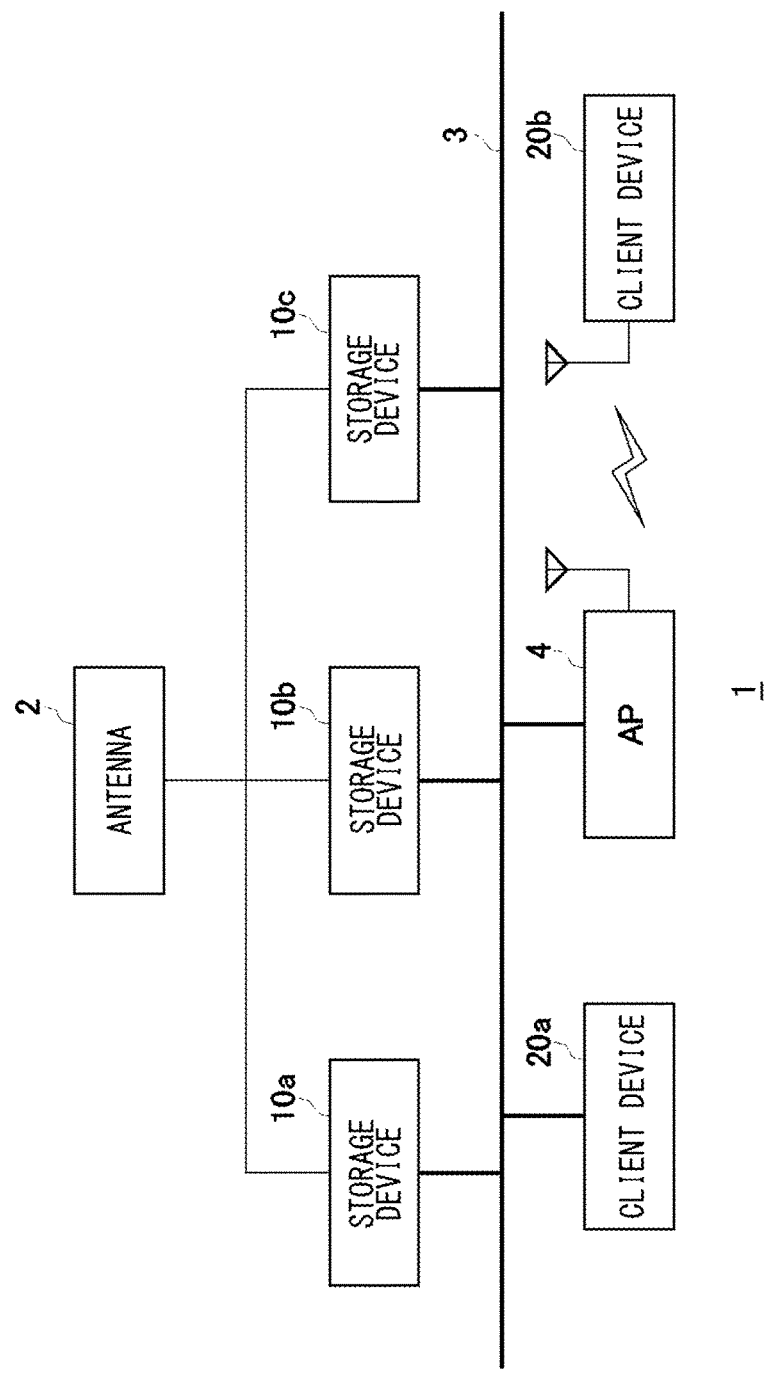
FIG. 1 illustrates a structure of a storage system according to an exemplary embodiment.

The invention will now be described by reference to the preferred embodiments. This does not intend to limit the scope of the present invention, but to exemplify the invention.

In recent years a network attached storage (NAS) is installed at home and the contents recorded by a personal video recorder (PVR) are transferred to the NAS via a network. Thus, those contents are managed by the NAS in a centralized manner. Constructing such a storage system allows the PVR to be of a minimum recording capacity, so that it is not required to replace the current PVR for the purpose of enlarging the recording capacity thereof.

At the same time, it suffices that in such a storage system the PVR substantially functions as a tuner only. Thus, the features and functions provided in the PVR are more than necessary and some of them may not be used at all. Also, since the PVR and the NAS need their own separate hardware, appropriate installation spaces therefor must be secured.

In view of the above, a storage device provided with the NAS function and the recording function is proposed in a storage system described below. As a result, a single storage device operates and functions as both an NAS and a PVR, thereby saving the installation space and increasing the space utilization efficiency and also improving the flexibility concerning the maintenance. Also, the storage device does not have the user interface but a dedicated application is installed on a client device accessing the storage device so that the client device can provide a user interface. As a result, the recording capacity of the system as a whole can be easily enlarged by increasing the number of storage devices connecting to the network. At the same time, the storage devices can be operated by the user constantly using the same user interface, independently of the number of storage devices, because the user interface is provided by the client device.

FIG. 1 illustrates a structure of a storage system 1 according to an exemplary embodiment of the present invention. In the storage system 1, client devices 20a and 20b (hereinafter generically referred to as "client device 20" or simply "client devices 20" also) and storage devices 10a, 10b and 10c (hereinafter generically referred to as "storage device 10" or simply "storage devices 10" also) connect to a network 3. Though FIG. 1 shows a plurality of client devices 20a and 20b and a plurality of storage devices 10a, 10b and 10c, a single client device 20 and a single storage device 10 suffice in the storage system 1.

The storage device 10 has a NAS (network attached storage) function and a recording function. The storage device 10 is provided with a hard disk drive, and this hard disk drive has a recording capacity of 300 GB or more, for instance. It should be noted here that the storage device 10 may be configured by including a recording medium other than the hard disk drive, such as flash memory. Though the storage device 10 does not have a display unit therein, the storage device 10 is equipped with LEDs indicating an operating state and the like to a user. In the storage system 1, the storage device 10 functions as a media server, and the client devices 20 that are compatible with DLNA (digital living network alliance) can access the storage device 10 and obtain the recorded contents and play them back.

In order to achieve the recording function, the storage device 10 is connected to an antenna 2 and includes a three-wave tuner that receives and processes the digital terrestrial broadcasting, the BS (broadcasting satellite) digital broadcasting and the CS (commercial satellite) digital broadcasting. In a connection configuration shown in FIG. 1, the broadcast signal from the antenna 2 is branched off and inputted into the storage devices 10a to 10c, respectively. Note that each storage device 10 may be provided with an antenna input terminal and an antenna output terminal. In such a case, the connection configuration may be as follows, for instance. That is, the antenna input terminal of the storage device 10a may connect to the antenna 2, the antenna output terminal of the storage device 10a may connect to the antenna input terminal of the storage device 10b, and the antenna output terminal of the storage device 10b may connect to the antenna input terminal of the storage device 10c, for instance, so that the storage devices 10a, 10b and 10c can receive the broadcast signals.

In the present exemplary embodiment, the storage device 10 functions as a single-tuner PVR and is capable of recording a television program. If, in the storage system 1, one storage device 10 is connected to the network 3, the storage device 10 will function as a signal-tuner PVR. If, in the storage system 1, two storage devices 10 are connected to the network 3, the storage devices 10 will function as a double-tuner PVR. If, in the storage system 1, three storage devices 10 are connected to the network 3, the storage devices 10 will function as a triple-tuner PVR. Every time the number of storage devices 10 connected to the network 3 increases, not only the number of television programs that can be simultaneously recorded increases but also the storage capacity in the storage system increases. In this manner, the present exemplary embodiment provides a highly-extendable storage system 1 capable of increasing the number of tuners and the storage capacity by simply adding the storage devices 10. Since the storage device 10 functions as an ordinary NAS, the ability to increase the storage capacity like this with ease contributes to improving its flexibility as a NAS system.

The client device 20 connects to the display unit or is configured by including a display. The client device 20 may be a stationary game device or a desktop personal computer that connects to the display unit or may be a mobile game device or a notebook-size personal computer structured integrally with the display.

The client device 20 acquires content files stored in the storage device 10 and plays them back. The client device 20 may be connected to the network 3 using a cable or connected wirelessly thereto via an access point (AP) 4. The AP 4 may also function as a router that connects to an external network. In such a case, the client device connected to the external network can access the storage device 10.

To provide a user interface with which the user operates the storage device 10 functioning as a PVR, the client device 20 installs a dedicated application in controlling the recording function of the storage device 10. Thereby, the user can use the storage device 10 as a recorder and can perform operations, such as television program recording reservation and the watching of the recorded programs, by the use of the user interface provided by the client device 20.

Where a plurality of storage devices 10 are connected to the network 3, each storage device 10 is managed by a recorder operation application installed on the client device 20. Since each storage device 10 has no user interface, there is no need to have a video output and therefore its manufacturing cost can be driven down. Also, all what the user has to do is to connect the storage device 10 to the network 3. Such a simple operation as this can increase the recording capacity in the storage system 1 and the number of simultaneously recordable television programs. Hence, an extremely highly flexible storage system 1 can be provided.

FIG. 2 is a flowchart showing a registration processing performed by a storage device 10. A UPnP (Universal Plug and Play) protocol is used in the DLNA. As the storage device 10 is connected to the network 3 (S10), an IP (Internet Protocol) address is assigned by DHCP (Dynamic Host Configuration Protocol). Then a discovery processing using SSDP (Simple Service Discovery Protocol) is performed. As the storage device 10 sends out multicast packets (Notify method) (S12), a client device having received the multicast packet detects a device that is newly connected to the network (S14). The client device 20 makes an inquiry to the detected device (S16). Then a storage device 10 responds to the inquiry (S18). As a result, the client device 20 recognizes that the newly detected device is said storage device 10 (S20). At this time, the recorder operation application in the client device 20 provides a screen with which to prompt the user to input the PIN (Person Identification Number) code (S22).

FIG. 3A illustrates an entry screen of pin code. The device ID of the detected storage device 10 and an input box are displayed on the entry screen. Note that information with which to uniquely identify the storage device 10 may be displayed in place of the device ID or may be additionally displayed besides the device ID.

A personal identification number (PIN) is assigned to each storage device 10. The PIN code has a unique value for each storage device 10 and serves to uniquely identify each storage device 10. A controller provided in each storage device 10 holds a unique PIN code and uses the PIN code when data is received from and transmitted to other devices.

A mark indicating the PIN code is affixed to the casing of a storage device 10 in such a manner as to be recognizable by the user. The PIN code may be engraved or impressed on the casing of the storage device 10 or may be recorded and printed on a document supplied with the storage device 10 when purchased. The user manually enters the PIN code on the entry screen provided by the client device 20. The recorder operation application sends the entered PIN code to the storage device 10 identified by the device ID (S24) and the controller of the storage device 10 compares the entered PIN code against the PIN code held by the controller. If the entered PIN code and the one held thereby agree with each other, the controller of the storage device 10 will respond to the client device 20 accordingly (S26). As a result, the client device 20 registers the storage device 10 (S28). As the client device 20 completes the registration of the storage device 10, the client device 20 can treat the storage device 10 as a PVR.

In general, there is no need to enter a PIN code and register the device if the NAS is connected to an in-home network. Thus, the client device 20 according to the present exemplary embodiment can treat the storage device 10 as a NAS without having to register the PIN code. Hence, the process of registering the PIN is not required if the storage device 10 is not used as a PVR. As described above, the user can use the storage device 10 as a PVR if the client device 20 registers the PIN code of the storage device 10.

When the client device 20 registers a plurality of storage devices 10 connected to the network 3, the client device 20 accesses the plurality of registered storage devices 10 so as to furnish the user with a single user interface. Thus the user can operate the recording function constantly using the same user interface, independently of the number of storage devices connected to the network 3.

Although the flowchart of FIG. 2 shows an example where a single storage device 10 is detected by the discovery processing, a plurality of storage devices 10 can be detected simultaneously. FIG. 3B illustrates an entry screen of PIN codes.

Where a plurality of storage devices 10 are detected, it is difficult for the user to comprehend which PIN code is to be inputted to which input box. Thus, the arrangement may be such that when the user selects an input box, the LED of a storage device 10 corresponding to the selected input box lights up. Verifying the lighting of the LED, the user enters the PIN code affixed to the storage devices 10 in the input box. Thereby, the user can enter an appropriate PIN code in the input box. Note that the device ID displayed on the entry screen may be additionally written in the mark that has already indicated the PIN code. In this case, the user can learn the correspondence between the device IDs and the PIN codes, so that an appropriate PIN code can be entered without the LED being on.

By registering the PIN codes as described above, the client device 20 can control the storage device 10 as a PVR. As each storage device 10 receives a playback request from a client device 20, it supplies content to the client device 20. Where a plurality of client devices 20 are connected to the network 3, there may be cases where the playback requests are received from a plurality of client devices 20. In each storage device 10, the upper limit is set to the number of outputs of content. Thus, the playback requests from the client devices 20 exceeding the upper limit are denied.

On the other hand, for a playback request from a predetermined application (of a client device 20), such a request may be received in preference to the other applications. The storage device 10 stores in a priority list the device information on the client devices 20 to which the content is to be preferentially supplied. When the storage device 10 receives a playback request from a client device 20 while sending the content to the client devices 20 the number of which is within the upper limit, the storage device 10 obtains the device information on the client device 20 that has sent the request. If its device information is contained in the priority list, the storage device 10 will forcibly stop the transmission of the content to any one of the client devices 20 and receive the playback request from the client device 20 contained in the priority list.

If, however, all of the client devices 20 to which the content is already being delivered are contained in the priority list (here, the number of all client devices 20 thereto is within the upper limit), the storage device 10 will reject the playback request from a new client device 20. As a result, the active delivery of content to the client devices 20 contained in the priority list can continue without being interrupted. Also, a modification may be as follows. That is, the storage device 10 may have a function to predict the ending time of the content delivery and convey the waiting time to the client device 20 whose playback request has been denied. For example, when the content distribution currently being undertaken is to be completed in five minutes, the message indicating "the playback can be started five minutes later" may be conveyed to the client device 20 that has issued the playback request.

By employing the storage system 1 according to the present exemplary embodiment, simply connecting the storage devices 10 to the network 3 can increase the number of simultaneously recordable television programs (the number of tuners). However, assume, for example, that the recording is performed solely by the storage device 10a in a concentrated manner amongst the available storage devices 10a, 10b and 10c being connected to the network 3 and also the recording capacity of the storage device 10a is in substantially full utilization. Then it will be difficult to record any additional programs on the storage device 10a and therefore the number of tuners will be actually reduced. To avoid such a situation as this, each storage device 10 may work to cooperate with each other.

Each storage device 10 manages its own remaining recording capacity. If, for example, the remaining recording capacity of the storage device 10a falls below a predetermined capacity (e.g., 20 GB), the storage device 10a will make inquiries to the other storage devices 10b and 10c about whether a content can be transferred to the storage device(s) 10b and/or 10c or not. If, for example, the remaining recording capacity of the storage device 10b exceeds a predetermined capacity, the storage device 10b will notify the storage device 10a accordingly and the storage device 10a will move some contents stored in the storage device 10a to the storage device 10b so that the remaining recording capacity of the storage device 10a can exceed the predetermined capacity. As a result, the storage device 10a can acquire a sufficient remaining recording capacity and therefore the total number of tuners in the storage system 1 can be kept at "three".

Using this arrangement, each storage device 10 may autonomously perform the process of transferring content so that the remaining recording capacity is almost equal among each storage device 10. In this case, the storage device 10 manages not only the remaining recording capacity of its own storage device 10 but also the remaining recording capacities of the other storage devices 10. The remaining recording capacities of the other storage devices 10 are acquired by making inquires to the other storage devices 10 at regular intervals or mutually notifying the remaining recording capacity between the own storage device 10 and the other storage devices 10 at regular intervals. Through such a coordinated operation as described above, the remaining recording capacity is almost equal among each storage device 10, so that the load such as access to each storage device 10 can be evenly divided alleviated among the storage devices 10.

When the storage device 10 autonomously performs the process of transferring content, it is preferable that the storage device 10 should notify the user of the fact that the content has been transferred. Alternatively, the storage device 10 may convey the detailed content of the process of transferring content to an application designed for use with a recorder (hereinafter simply referred to as "recorder application") of the client device 20, so that the user can learn, through the user interface, that the content has been moved.

A description has been given above of an example where the storage device 10 autonomously manages the recording capacities. Instead, in a modification, the recorder application may manage the recording capacities of the storage devices 10. In this modification, the recorder application acquires the recording capacity of each of the registered storage devices 10 at regular intervals. If there is any storage device 10 whose remaining recording capacity falls below a predetermined capacity, the recorder application will transfer a content from such a storage device 10 to another storage device 10 (or other storage devices 10) whose remaining recording capacity is sufficiently available. By employing this modification, all the storage devices 10 can be guaranteed their respective sufficient levels of the remaining recording capacities and therefore the number of tuners available in the storage system 1 as a whole can be maintained intact.

The present invention has been described based upon illustrative exemplary embodiments. The above-described exemplary embodiments are intended to be illustrative only and it will be obvious to those skilled in the art that various modifications to the combination of constituting elements and processes could be developed and that such modifications are also within the scope of the present invention.

Where a plurality of storage devices 10 are connected to the network 3, the recorder application may use each storage device 10 for each category of content. The recorder application uses the storage device 10a for the category of cartoons and the storage device 10b for dramas, for instance. If, under this condition, the user brings with him/her a recorded cartoon film to his/her friend's home to watch the film together there, for example, the user will only need to take the storage device 10a to his/her friend's home. Sorting the recorded contents of the storage device 10 into the respective specified categories helps increase the convenience when carrying the storage device(s) 10 is taken into consideration.

Where a plurality of storage devices 10 connect to the network 3, a type of usage is conceivable where the programs on a specific television channel are constantly recorded. Assume the digital terrestrial broadcasting by key commercial television stations, then the television programs broadcast on all of the key commercial stations (five companies) can be recorded if the storage devices 10 capable of recording the programs of the five key commercial stations are provided. As a result, for the recording of television programs broadcast on the key commercial television stations, the user can watch his/her favorite programs whenever he/she wishes without the trouble of having to make recording reservation for each television program of his/her choice. This is an advantage gained by easily increasing the number of tuners and the recording capacity through the addition of the storage devices 10. As the remaining recording capacity gets low, each storage device 10 deletes contents beginning with the chronologically oldest one from the hard disk and then overwrites the old contents with new ones.

Also, RAID (Redundant Array of Independent Disks) may be constructed using a plurality of storage devices 10. A file system using the NAS function in the storage devices 10 may be managed in a manner such that the content files recorded using the recording function is invisible to the user.

A description has been given above of an example where the storage device 10 functions as a single-tuner PVR but the storage devices 10 may function as a PVR of a plurality of tuners. Also, the storage device 10 of a single tuner and the storage devices 10 of a plurality of tuners may be mixed together in the storage system 1. And it is preferable that the storage devices 10 are freely connected to the network 3 without regard to the number of tuners in the storage devices 10.

Also, a description has been given of the exemplary embodiment where a client device 20 registers storage devices 10. Instead, in a modification, a storage device 10 may register client devices 20. In this modification, the storage device 10 may operate in a manner such that the storage device 10 receives access from the client devices 20 that have been registered but does not receive access from the client devices 20 that have not been registered. In another modification, when the storage device 10 functions as a NAS, the storage device 10 may operate in a manner such that the storage device 10 operates regardless of whether the client devices 20 have been registered or not. And when the storage device 10 functions as a PVR, the storage device 10 may operate in a manner such that the storage device 10 receives access from the client devices 20 that have been registered but does not receive access from the client devices 20 that have not been registered.

What is claimed is:

1. A storage system where a client device and a storage device are connected to a network, wherein the client device, which accesses the storage device, provides a user with a user interface with which the user operates the storage device, and
   wherein the storage device has a network attached storage (NAS) function and a recording function to record a broadcast signal which the storage device receives directly from an antenna via an input on the storage device, and
   wherein the storage device has no interface of its own with which to operate,
   wherein an application for controlling the recording function of the storage device is installed on the client device,
   wherein a plurality of the storage devices are connected to the network,
   wherein the antenna is connected to an input of a first storage device, and
   an output of the first storage device is connected directly to an input of a second storage device in order to pass the broadcast signal to the second storage device.

2. A storage system according to claim 1, wherein
   when the client device registers the plurality of storage devices connected to the network, the client device accesses the plurality of storage devices registered and provides the user with a single user interface.

3. A storage device which is connected to a client device via a network, wherein the storage device has a network attached storage (NAS) function and a recording function to record a broadcast signal which the storage device receives directly from an antenna via an input on the storage device, and
   wherein the storage device has no interface on its own with which to operate
   wherein a user operate the recording function of the storage device with a user interface provided by the client device which accesses the storage device,
   wherein an output of the storage device is connected directly to an input of a second storage device in order to pass the broadcast signal to the second storage device.

4. The storage device according to claim 3, wherein the storage device has a server function of a digital living network alliance function, and
   wherein, when the client device registers the storage device connected to the network, the client device accesses the storage device and obtains a content recorded by an operation with an user interface provided by the client device.

5. The storage device according to claim 3, wherein the storage device provides a content, recorded by an operation with an user interface provided by the client device which accesses the storage device, to the client device by the network attached storage function.

* * * * *